(12) United States Patent
Lehnert

(10) Patent No.: US 7,931,525 B2
(45) Date of Patent: Apr. 26, 2011

(54) AIR FLOW CONTROL IN A VENTILATING PIPE

(75) Inventor: Frank Lehnert, Ruti (CH)

(73) Assignee: Belimo Holding AG, Hinwil (CH)

(*) Notice: Subject to any disclaimer, the term of this patent is extended or adjusted under 35 U.S.C. 154(b) by 336 days.

(21) Appl. No.: 10/596,263

(22) PCT Filed: Nov. 19, 2004

(86) PCT No.: PCT/CH2004/000699
§ 371 (c)(1),
(2), (4) Date: Jun. 7, 2006

(87) PCT Pub. No.: WO2005/053975
PCT Pub. Date: Jun. 16, 2005

(65) Prior Publication Data
US 2007/0099556 A1 May 3, 2007

(30) Foreign Application Priority Data
Dec. 8, 2003 (CH) .................. 20030002087

(51) Int. Cl.
F24F 7/00 (2006.01)

(52) U.S. Cl. ........................................ 454/290

(58) Field of Classification Search .......... 454/290, 454/295, 333, 361
See application file for complete search history.

(56) References Cited

U.S. PATENT DOCUMENTS

| | | | | |
|---|---|---|---|---|
| 5,310,021 | A * | 5/1994 | Hightower | 185/40 R |
| 5,741,180 | A * | 4/1998 | Xia et al. | 454/327 |
| 2001/0027814 | A1 * | 10/2001 | Stone et al. | 137/601.12 |
| 2001/0055947 | A1 * | 12/2001 | McCabe | 454/369 |

* cited by examiner

Primary Examiner — Kenneth B Rinehart
Assistant Examiner — Samantha A Miller
(74) Attorney, Agent, or Firm — Thaddius J. Carvis

(57) ABSTRACT

The invention relates to a device (10) for controlling airflow (A) in a ventilation pipe (12) comprising one or several air throttle (32) which are synchronously actuated and prevent air flowing (A) in the air pipe in the closed position thereof. The ventilation pipe (12) is provided with a longitudinally extending fixing bar (16) which is arranged on a symmetry plane and provided with the pivot bearing (30) of an axis (28) for driving the air throttle(s) (32) and means (50, 52) for transmitting a force and/or torque to the drive axis (28) connected to the air throttle(s) (32). Said fixing bar (16) provided with different air throttles (12) is usable for the ventilation pipes having different cross sections and forms, an angle (β), preferably, ranging from 15° to 90°, with a longitudinal axis (L) or with a wall (18) of said ventilation pipe (12).

22 Claims, 3 Drawing Sheets

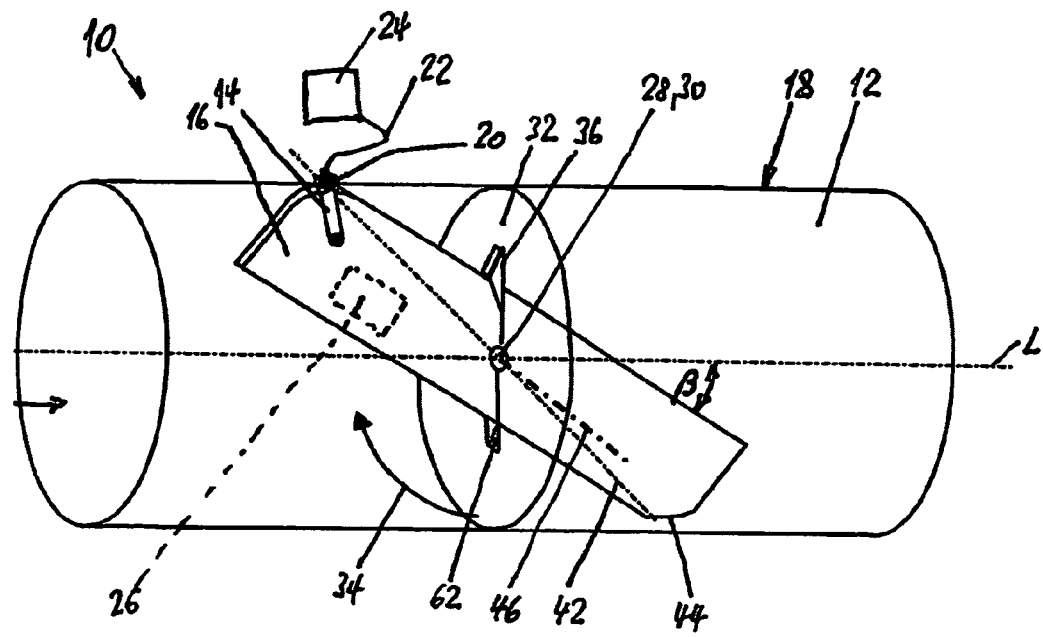
FIG..1
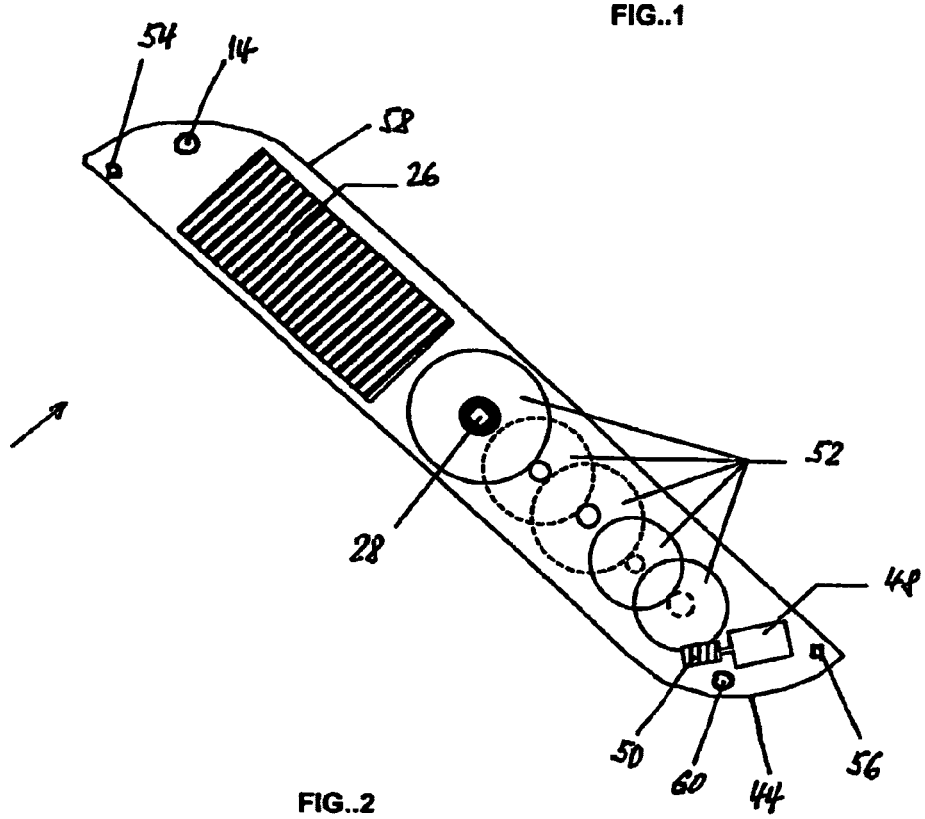
FIG..2

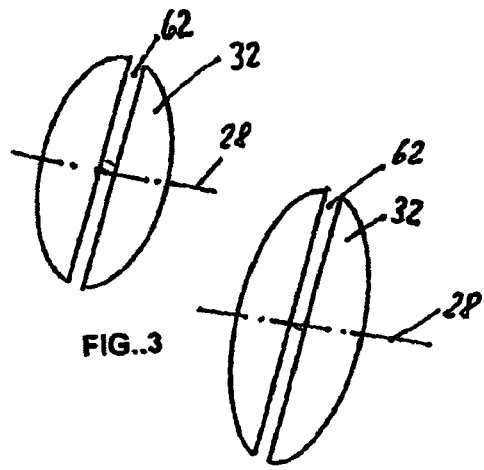
FIG..3
FIG..4
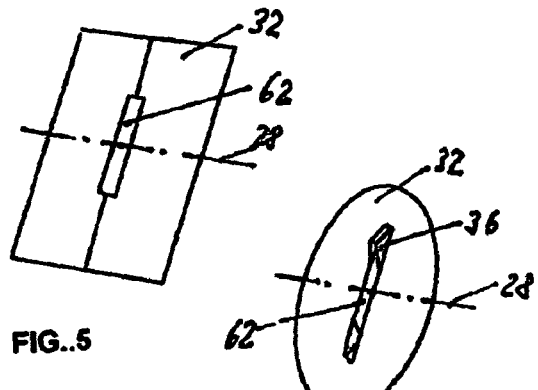
FIG..5
FIG..6
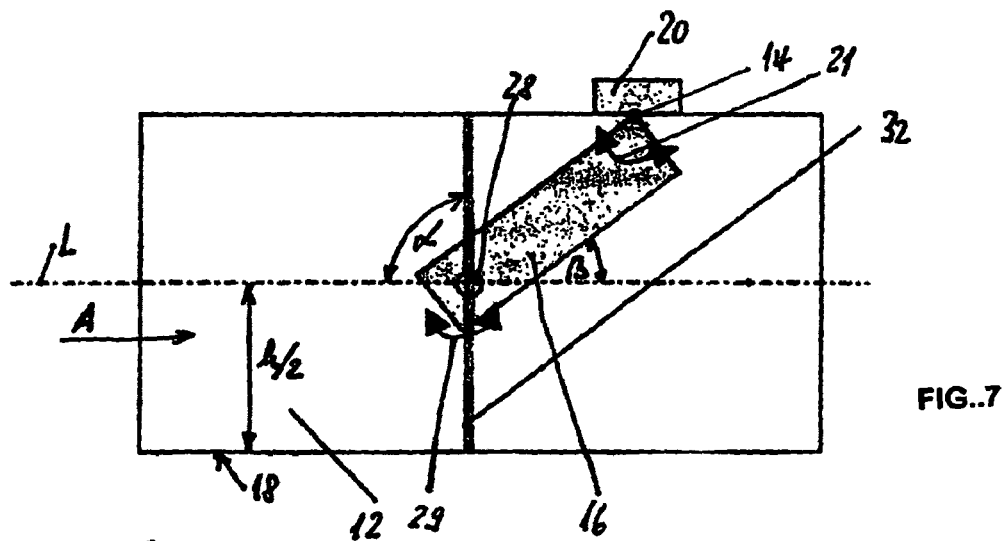
FIG..7
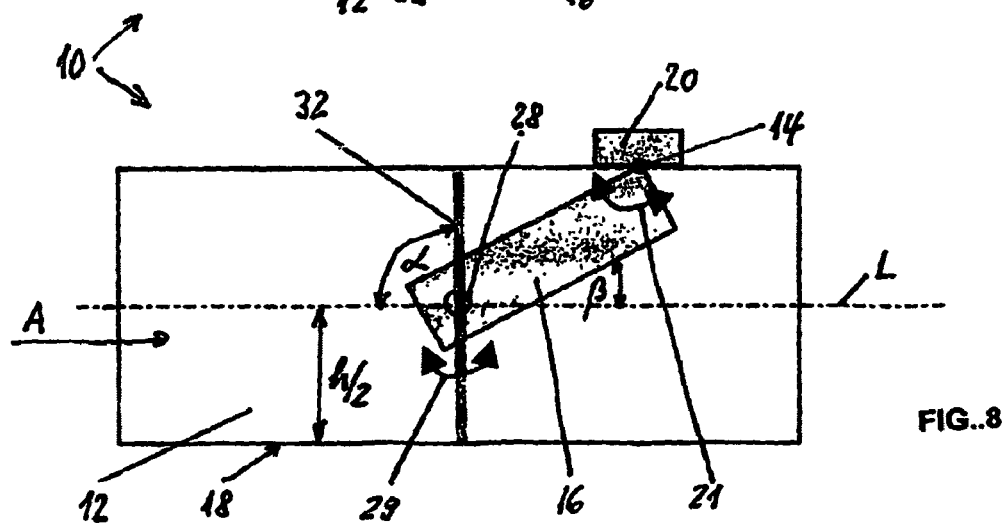
FIG..8

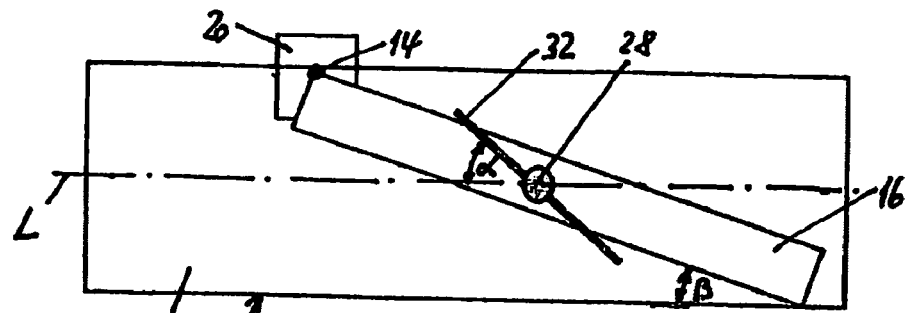
FIG..9
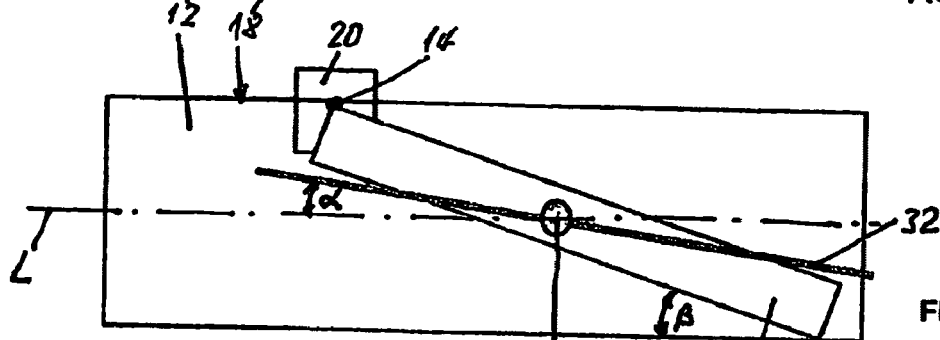
FIG..10
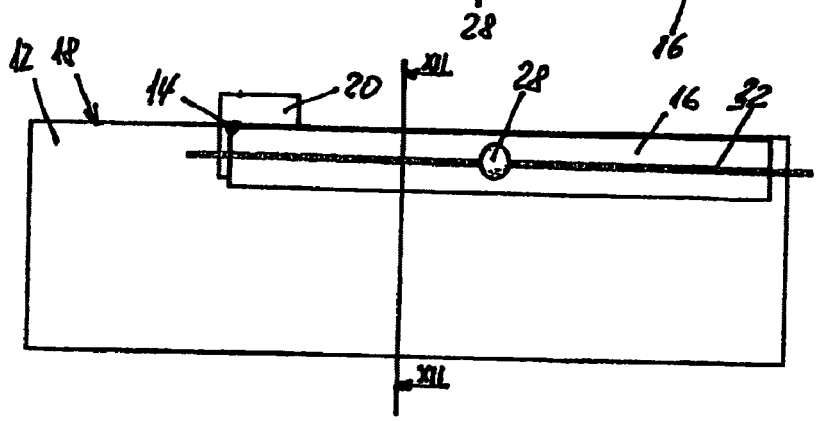
FIG..11
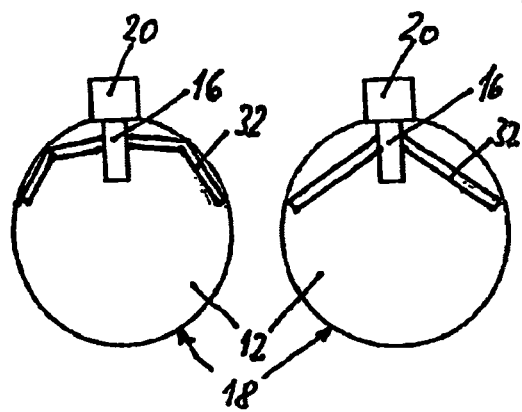
FIG..12
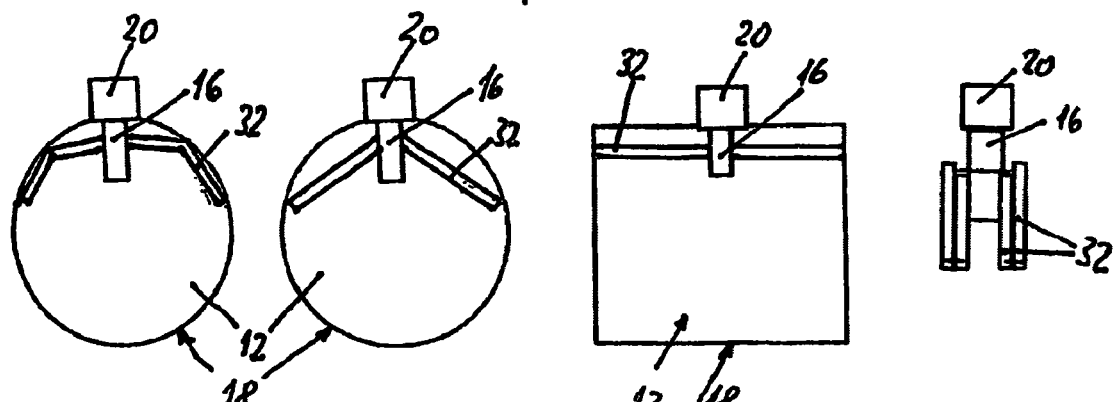
FIG..13     FIG..14     FIG..15

AIR FLOW CONTROL IN A VENTILATING PIPE

The invention relates to a device for controlling the air flow in a ventilating pipe with one or more air flaps which can be actuated synchronously and which prevent the air flow in the pipe in the closed position.

The expression "ventilating pipe" is used for pipes with a round, elliptical, square or rectangular cross section, for example, which are often called ventilation channels. Ventilation systems are used in buildings, in particular residential, office, trade and industrial buildings, generally combined with fire and smoke protection devices, and tunnels, but also in the automotive industry.

Volume flow control with pivotable air flaps play an important role in ventilation systems. The volume flow is measured with a suitable measuring instrument, for example with the NMV-D2M designed as a compact unit of drive, pressure sensor and controller from Belimo Automation AG, CH-8340 Hinwil, which apparatus makes the display of the volume flow in $m^3/h$ possible. This substantially simplifies the adjustment and optimisation of the ventilation system and makes lower operating costs possible.

A blocking mechanism for a ventilation opening, in particular in an air conditioning system of a motor vehicle, is known from DE 10053291. The blocking mechanism has a housing frame surrounding the ventilation opening and a blocking member, which is provided for closing and freeing the ventilation opening, with lamellar elements. These lamellar elements are connected to one another and can be pivoted about lamellar axes which are parallel to one another. One of the lamellar elements can be provided with a drive motor. Owing to the integration of the drive motor in a lamellar element, the dimensions of the blocking devices are not influenced. The lamellar axes, three in the examples shown, are movably guided along associated guides on the side parts. Synchronous lamellar movement is ensured by end face hinge elements or by common, push rod-like connection elements.

The present invention is based on the object of providing a device of the type mentioned at the outset, which can be used for tube cross sections of different sizes and with all cross sectional shapes.

The object is achieved according to the invention in that a fastening web with a pivot bearing for the drive axle of the air flap(s) and means for transmitting force and/or torque to the drive axle connected to the air flap(s) are arranged in the ventilating pipe, on a longitudinally extending plane of symmetry, wherein the same fastening web fitted with various air flaps can be used for cross-sectionally differently dimensioned ventilating pipes. Special and refined embodiments of the device are the subject of the dependent claims.

For cross-sectionally round ventilating pipes, an air flap is generally preferred which covers the entire cross section in the closed position. The geometrical basic form of the air flap depends on its position in the closed position. If the flap in the closed position is located perpendicularly to the longitudinal axis or longitudinal centre plane of the ventilating pipe, the air flap is always round. In the case of a smaller angle $\alpha$ of the air flap relative to the longitudinal axis of the ventilating pipe, the basic form of the air flap is elliptical. The smaller the angle $\alpha$ in the closed position, the greater is the ratio of the larger to the smaller axis of the ellipse.

In particular, in the case of ventilating pipes with a rectangular cross-section, it may be expedient to form more than one air flap, in particular three or five. Synchronous actuation is ensured with means which are known per se, in a drive of the central air flap, by articulated connection of the flap ends by way of gear wheels or a connecting rod and with separate drives of the air flaps, by means of synchronous activation of the drives.

In practice, the fastening web is expediently arranged in the vertical plane of symmetry of a ventilating pipe. The fastening web is preferably detachable at one end and anchored in the plane of symmetry so as to be pivotable on the pipe wall. The pivoting range of a short fastening web is 0 to 180°. It may be fixed at each angle $\beta$ of the longitudinal axis and to the pipe wall. The fastening web is at least so long that the pivot bearing for the drive axle of the air flaps, at an angle $\beta$ of 90°, rests on or below the longitudinal axis L or half way up the ventilating pipe. The smaller the cross-sectional pipe dimensions, the smaller the angle $\beta$ becomes. The geometric ratios inevitably have to be such that the pivot bearing mentioned for the drive axle always rests on the longitudinal axis of a round tube or half way up the longitudinal centre plane of a rectangular pipe.

The fastening web is expediently the same length or longer than the relevant internal dimension of the pipe cross section. Inevitably, according to this variant, the axis of the pivot bearing for the drive axle of the air flaps must also be such that at each angle $\beta$ of the fastening web, it is located on the longitudinal axis or half way up the longitudinal centre plane L. This angle $\beta$, for practical reasons, cannot therefore be arbitrarily small; the preferred range is between 15 and 90° with respect to the longitudinal axis or the longitudinal centre plane of the ventilating pipe.

In the case of fastening webs which can be pivoted in the vertical plane, a fastening web which is longer than the corresponding pipe dimension rests freely pivotably on the lower pipe wall. In the case of a ventilating pipe with a round cross section, because of the radius of curvature, a certain lateral guidance is produced, in particular in the case of a small pipe diameter. With all pipe diameters and in particular, in cross-sectionally rectangular ventilating pipes, a groove may be formed which ensures lateral stabilisation. This free end may also be releasably fastened, for example by screwing.

According to a particularly advantageous embodiment of the invention, the actuator is arranged in the fastening web, with it transmitting the torque to the drive axle for the air flap directly or by way of mechanical transmission means. The electronics are also expediently arranged, at least partially, in the fastening web.

The fastening web is as streamlined as possible to avoid a significant drop in pressure in the ventilating pipe and the formation of undesired turbulence. It is therefore rounded or prismatic with rounded edges, at least in the upstream direction.

The advantages of the present invention can be summarised as follows:
  The same fastening web can be used for various pipe dimensions and the costs for handling and storage are minimal compared to known devices.
  The assembly works can be reduced to a screw, which can also be a cable feedthrough.
  The air flap(s) is/are assembled directly on the drive shaft.
  The blades of the air flap(s) can be folded over for storage, transport and assembly.
  Retrofitting in to a ventilating pipe is possible.
  With sufficient installation space outside the ventilating pipe, the actuator can also be located outside the ventilating pipe.
  The air resistance can be kept approximately equally low compared with conventional devices.
  With certain embodiments, the fastening web can be folded up for pipe inspection or pipe cleaning.

The invention will be described in more detail with the aid of embodiments shown in the drawings, which are also the subject of dependent claims. In the drawings, schematically:

FIG. 1 shows a perspective view of a section of a ventilating pipe with control of the air flow, FIG. 2 shows an opened fastening web from the side, FIG. 3 to 6 show perspective views of air flaps, FIG. 7, 8 show sections of ventilating pipes of different diameter with a freely pivotable short fastening web, FIG. 9 shows a section of a ventilating pipe with a long fastening web and a circular air flap, FIG. 10 shows a variant of FIG. 9 with an elliptical air flap, FIG. 11 shows a variant of FIG. 10 with a folded-up fastening web, FIG. 12 shows a cross section XII-XII through FIG. 11 with an oval configuration, FIG. 13 shows a variant of FIG. 12, FIG. 14 shows a cross section XII-XII through FIG. 11 with a rectangular configuration, and FIG. 15 shows a side view of a fastening web with blades of the air flap folded over for transport.

FIG. 1 shows a device 10 for controlling the air flow A in a ventilating pipe 12 made of metal or plastics material. For the sake of clarity, this cross-sectionally circular ventilating pipe 10 with a longitudinal axis L is shown transparent.

Arranged in the vertical plane through the longitudinal axis L is a fastening web 16 which is rotatably mounted about a fastening shaft 14. The fastening shaft 14 in turn penetrates a holder 20, which is fastened in the pipe wall 18 by means of a screw to the upper apex thereof. An electrical cable 22 leads from an only rudimentarily shown monitor 24 in to the interior of the fastening web 16, which contains the electronics 26 which are not arranged in the monitor 24. Instead of the monitor 24, an LED lamp may also be arranged to display the flap position.

Exactly at the level of the longitudinal axis L, a drive axle 28 or drive shaft is arranged in a pivot bearing 30 of the fastening web 16. The drive axle 28 is expediently lengthened on the two end faces up to the pipe wall 18 and therefore fulfils a lateral support function. The drive axle 28 and an air flap 32 are rigidly connected to one another. A torque is exerted in the direction of the arrow 34 onto the drive axle 28, by an actuator, not shown, until the air flap 32 has reached the predetermined position. According to FIG. 1 it is left open whether the torque is exerted by an actuator in the interior of the ventilating pipe 12 or outside thereof. In the second case, the drive axle 28 penetrates the pipe wall 18 and can be rotated therein. The actuator is designed in such a way that it can hold the air flap 32 in the predetermined position even in the case of a strong air flow A.

In the present case, the air flap 32 is equipped with two diagonally opposing sealing hoods 36. As soon as the gap 62 configured in the air flap 32 leaves the region of the fastening web and would allow free passage for the air flow A, the cavity is covered by the two sealing hoods 36 abutting with little play.

The fastening web 16 rests freely on the inner lower apex of the pipe wall 18. The support and the fastening axle 14 form a plane 42, which is passed through by the longitudinal axis L in the region of the drive axle 28. If this were not the case, the air flap 32 could not be rotated into a closed position.

The support face 44 of the fastening web 16 must be calculated such that the drive axle 28 at every angle β, which is dependent on the diameter of the ventilating pipe 12, rests precisely on the longitudinal axis L; otherwise no precise rotation of the air flap 32 about the drive axle 28 would be possible, shown three-dimensionally by the dash-dot line 46.

FIG. 2 shows the interior of the fastening web 16. Activated by the electronics 26, the actuator 48, in the present case an electric motor, is made to rotate. The further mechanical transmission means 52, a sharply reduced toothed gearing, is made to rotate by way of a drive screw 50. In this manner, the drive axle 28 for the air flap which is not shown in FIG. 2, can be very precisely positioned and effectively held in this position. The connecting wires or cables to and from the electronics 26 are not shown for the sake of simplicity.

A measuring cell 54, 56 is arranged in each case on both end sides of the fastening web 16 for differential pressure measurement $p_1$, $p_2$ in the ventilating pipe 12 (FIG. 1). The contours 58 of the fastening web 16 are optimised from the point of view of flow, and the air resistance is very low despite the multiform configuration of the interior.

If required, the lower end face, the support face 44, can also be fastened to the lower inner pipe wall 18 (FIG. 1), for example by way of a bore 60.

FIG. 3 shows an air flap 32 with a substantially circular blade shape, which has a diagonal gap 62 to receive the fastening web 16 (FIG. 1, 2). The two halves of the air flap 32 are fastened to the indicated drive axle 28. The air flap 32 can adopt an angle α of 0 to 90° in the ventilating pipe 12 with respect to the longitudinal axis L. (FIG. 7).

FIG. 4 shows an elliptical air flap 32, which otherwise corresponds to the embodiment of FIG. 3. The angle α mentioned may only adopt values between 0 and 60°, for example, and the periphery of the air flap 32 then rests on the inner face of the ventilating pipe 12. In the case of other ratios of the length to the width of the ellipse, the angle α changes accordingly.

The air flap 32 according to FIG. 5, which is also configured in two pieces, is intended for a rectangular cross-sectional ventilating pipe 12. The gap 62 is not continuous and the angle α is therefore limited downwards.

The only slightly elliptical air flap 32 according to FIG. 6 is configured in one piece and there is a non-continuous gap 62 on the longer diameter extending perpendicularly to the drive axle 28. At both end-face ends of the gap 62, with a corresponding pivot angle α to the upper and lower side, sealing hoods 36 are formed which receive the fastening web 16.

The device 10 shown in FIGS. 7 and 8 for controlling the air flow A in a ventilating pipe 12 with a larger diameter (FIG. 7) and a smaller diameter (FIG. 8) has a fastening web 16, which is shorter than the diameter of the ventilating pipe 12. It therefore has only one holder 20 with a fastening axle 14 and can be locked in any desired rotational position, which is indicated by the double arrow 21 about the fastening axle 14.

The angle β of the fastening web 16 is fixed relative to the longitudinal axis L or the longitudinal centre plane when the ventilating pipes 12 are not cylindrical. The drive axle 28 must be located precisely on the longitudinal axis L or half way up h/2 the longitudinal centre plane. This means that the angle β is greater, the greater the pipe diameter. The air flap 32 is in the closed position, which means an angle α of 90° with respect to the longitudinal axis L or the pipe wall 18.

FIGS. 9 and 10 show ventilating pipes 12 with a smaller diameter; the fastening web 16 accordingly has a small angle β with respect to the longitudinal axis L or the pipe wall 18. The only difference is that FIG. 9 has a circular air flap 32 and FIG. 10 has an elliptical one. Accordingly, the angle β in the closed position is 90° according to FIG. 9, and about 25° for FIG. 10.

In FIG. 11, the fastening web 16 with the drive axle 28 and the air flap 32 is folded up, and both angles α and β equal 0. The pipe can be inspected or cleaned without problems and the necessary free space is provided. The ventilating pipe 12 shown in FIG. 11 is square or rectangular, as shown in cross section in FIG. 14.

It is only possible to fold up the fastening web 16 in the case of round or elliptical pipe cross-sections according to FIGS. 12 and 13 when the blade-shaped air flaps 32 can be folded over or folded down. Technical solutions in this regard are known from other specialist areas.

FIG. 15 shows a unit consisting of a holder 20, fastening web 16 and completely folded over blade-shaped air flaps 32, producing a low transport volume.

As shown in FIGS. 12-15 the fastening web 16 is an elongate bar-shaped stiff element with a cross-sectional shape that is flat, i.e., the vertical dimension is bigger than the transverse dimension. In particular, the fastening web may be flat to fit within the slit-shaped gap 62 of the air flaps as shown in FIGS. 5 and 6. The contour 58 of the fastening web is a surface of a housing which contains the gearing (reducing gear 52 in FIG. 2) and preferably also the actuator 48 (FIG. 2).

The fastening axle 14 is arranged at one end of the fastening web as shown in FIGS. 1, 2, 7, 8, 9, 10, 11. The drive axle 28 is arranged at a distance from the fastening axle 14, e.g., in the middle of the fastening web 16 (as shown in FIGS. 1, 2, 10, 11) or close to a second end of the fastening web. The second end is opposite to the first end at which the fastening axle 14 is arranged (FIGS. 7, 8). The fastening axle 14 and the drive axle 28 are oriented parallel to each other (as shown in FIGS. 1, 2, 7-11).

The invention claimed is:

1. Device for controlling an air flow in a ventilating pipe comprising:
   a) one or more air flaps actuated synchronously and which prevent the air flow in the ventilating pipe in closed position,
   b) wherein each of the one or more air flaps is rigidly connected to a drive axle,
   c) a fastening web with a pivot bearing for said drive axle of the one or more air flaps, wherein the one or more air flaps are rotational about an axis of the drive axle,
   d) gearing means for transmitting force and/or torque to the drive axle connected to said one or more air flaps,
   e) wherein said gearing means for transmitting force and/or torque are mounted on the fastening web,
   f) a fastening web holder fixing the fastening web to the inside of the ventilating pipe wherein said fastening web and said gearing means for transmitting force and/or torque are arranged in the ventilating pipe, on a longitudinally extending plane of symmetry,
   g) a rotatable connection between said fastening web holder and the fastening web, wherein said rotatable connection is at a distance from said drive axle and parallel to said drive axle,
   h) such that the same fastening web fitted with various air flaps can be used for cross-sectionally differently dimensioned ventilating pipes.

2. Device according to claim 1, characterised in that the fastening web is fixed by the fastening web holder inside the ventilating pipe at an angle β of 15° to 90°, wherein said angle β of the fastening web is defined relative to a longitudinal axis of the ventilating pipe or relative to a wall of the ventilating pipe and said angle β is dependent on the diameter of the ventilating pipe.

3. Device according to claim 1 or 2, characterised in that the fastening web is fastened by the fastening web holder so as to be pivotable in said longitudinally extending plane of symmetry.

4. Device according to claim 1, characterised in that the fastening web extends over an entire cross-section of the ventilating pipe and rests at a free end with a support face on a wall-of the pipe.

5. Device according to claim 1 or 4, characterised in that the fastening web is detachably fastened at both ends to the inside of the pipe wall.

6. Device according to claim 1, characterised in that an actuator is integrated at least partially into the fastening web, for rotational movement of the drive axle.

7. Device according to claim 6, characterised in that the actuator acts on the drive axle by way of a reducing gear.

8. Device according to claim 1 characterised in that control electronics are installed at least partially in the fastening web.

9. Device according to claim 1, characterised in that the fastening web is round or prismatic and is provided with rounded edges to avoid a significant drop in pressure in the ventilating pipe and to avoid the formation of undesired turbulence.

10. Device according to claim 1, characterised in that a fastening point is provided, in each case, on the drive axle on either side of the fastening web for the one or more air flaps.

11. Device according to claim 1, characterised in that the drive axle of the one or more air flaps are lengthened for centering thereof on either side of the wall of the pipe and are supported there.

12. Device according to claim 1, characterised in that the one or more air flaps are blade-shaped and can be folded over parallel to the drive axle.

13. Device according to claim 12, characterised in that the blade-shaped air flap has a gap with three-dimensional sealing hoods for sealing until the closed position is reached.

14. Device according to claim 12, characterised in that the blade-shaped air flap is configured with a continuous gap for the fastening web, in one piece with a gap or with joined halves with a gap.

15. Device according to claim 1, characterised in that a monitor visually displays the flap position.

16. Device according to claim 1, characterised by measuring cells for measuring a differential pressure a volume flow and/or a position of the air flap, wherein said measuring cells are arranged on the fastening web.

17. Device according to claim 1, characterised in that the bearing for the drive axle is arranged at an end of the fastening web at a distance to said rotational connection between said fastening web holder and the fastening web.

18. Device according to claim 1, characterized in that the fastening web is an elongate bar-shaped stiff element with a cross-sectional shape that is flat.

19. Device according to claim 1, characterized in that the fastening web has a contour which is a surface of a housing which contains the gearing means and an actuator.

20. Device according to claim 1, characterized by a locking means for locking said rotatable connection between said fastening web holder and the fastening web at a rotational position during operation of the air flaps for fixing the same fastening web inside the ventilating pipe at an angle β fixed relative to a longitudinal axis of the ventilating pipe and depending on the diameter of the ventilating pipe.

21. A system adaptable for controlling an air flow in cross-sectionally differently dimensioned ventilating pipes comprising:
   a) at least two different air flaps having various dimensions for said cross-sectionally differently dimensioned ventilating pipes so as to prevent the air flow in the ventilating pipe in a closed position, b) a fastening web with a pivot bearing for a drive axle of said air flaps,
c) means for transmitting force and/or torque to said drive axle, wherein said means for transmitting force and/or torque are mounted on the fastening web,
d) wherein said fastening web and said means for transmitting force and/or torque are arranged in the ventilating pipe, on a longitudinally extending plane of symmetry,
e) wherein the two different air flaps are alternatively fixable to the drive axle depending on the cross-section of the ventilating pipe,
f) a fastening web holder fixable to the inside of the ventilating pipe for fixing the fastening web in the ventilating pipe,
g) a rotatable connection between said fastening web holder and the fastening web, wherein said rotatable connection is at a distance from said drive axle and parallel to said drive axle,
h) wherein each of the one or more air flaps is rigidly connectable to said drive axle and is rotational about said drive axle,
i) wherein the fastening web is fixable inside the ventilating pipe such that the same fastening web fitted with various air flaps can be used for cross-sectionally differently dimensioned ventilating pipes.

22. Device for controlling an air flow in a ventilating pipe comprising:

a) one or more air flaps actuated synchronously and which prevent the air flow in the ventilating pipe in closed position,
b) wherein each of the one or more air flaps is rigidly connected to a drive axle,
c) a fastening web with a pivot bearing for said drive axle of the one or more air flaps, wherein the one or more air flaps are rotational about an axis of the drive axle and the fastening web extends over an entire cross-section of the ventilating pipe and rests at a free end with a support face on a wall-of the pipe,
d) gearing means for transmitting force and/or torque to the drive axle connected to said one or more air flaps,
e) wherein said gearing means for transmitting force and/or torque are mounted on the fastening web,
f) a fastening web holder fixing the fastening web to the inside of the ventilating pipe wherein said fastening web and said gearing means for transmitting force and/or torque are arranged in the ventilating pipe, on a longitudinally extending plane of symmetry,
g) a rotatable connection between said fastening web holder and the fastening web,
h) such that the same fastening web fitted with various air flaps can be used for cross-sectionally differently dimensioned ventilating pipes.

* * * * *